United States Patent
Surma et al.

(10) Patent No.: US 7,844,578 B2
(45) Date of Patent: Nov. 30, 2010

(54) PARALLEL ARCHIVING FOR A MESSAGING SYSTEM

(75) Inventors: Peter Surma, Heidelberg (DE); Hans-Dieter Geyer, Mannheim (DE); Frantisek Deglovic, Wiesloch (DE)

(73) Assignee: SAP AG, Walldorf (DE)

( * ) Notice: Subject to any disclaimer, the term of this patent is extended or adjusted under 35 U.S.C. 154(b) by 1169 days.

(21) Appl. No.: 11/097,041

(22) Filed: Mar. 31, 2005

(65) Prior Publication Data

US 2006/0224641 A1 Oct. 5, 2006

(51) Int. Cl.
*G06F 17/00* (2006.01)
(52) U.S. Cl. ........................ 707/661; 709/101
(58) Field of Classification Search ............ 707/3, 707/10, 100, 202, 204, 661–673; 713/153; 235/487; 375/225; 709/101
See application file for complete search history.

(56) References Cited

U.S. PATENT DOCUMENTS 6,078,933 A * 6/2000 Szalwinski ............... 707/204
2002/0194157 A1 * 12/2002 Zait et al. ..................... 707/2
2003/0028580 A1 * 2/2003 Kucherawy ................ 709/101
2004/0143822 A1 * 7/2004 Jager et al. ................. 717/140
2005/0138353 A1 * 6/2005 Spies et al. ................. 713/153

OTHER PUBLICATIONS

EPO Communication pursuant to Article 94(3) EPC dated Aug. 18, 2009, issued by the European Patent Office in connection with corresponding EP Application No. 06006554.7-2211.

* cited by examiner

*Primary Examiner*—Apu M Mofiz
*Assistant Examiner*—Anteneh Girma
(74) *Attorney, Agent, or Firm*—Mintz, Levin, Cohn, Ferris, Glovsky & Popeo, P.C.

(57) ABSTRACT

A system and method of archiving messages is disclosed. A number p random numbers are stored in a control table, the random numbers being selected from a range (M, N) where N>M. Each random number is initially state-free in the control table. A number p archive processes are generated, each archive process configured to store one or more messages being processed by the messaging system to an archive. State-free random numbers are assigned to messages being processed by the messaging system. The messages being processed are divided by the messaging system among the p archive processes according to the assigned.

13 Claims, 5 Drawing Sheets

Control Table

| Number | State |
|---|---|
| m | In Process WP1 |
| m+1 | In Process WP2 |
| . | |
| . | |
| m+p-1 | In Process WPp |
| . | |
| . | |
| . | |
| . | |
| . | |
| n | |

Begin of Process → Archiver WP1
Begin of Process → Archiver WP2
Begin of Process → Archiver WPp

PARALLEL ARCHIVING FOR A MESSAGING SYSTEM

BACKGROUND

A messaging system is a collection of hardware and software that is configured to facilitate message communication between two or more entities. One example of a messaging system is a message exchange infrastructure for transmitting messages from one or more sending applications to one or more receiving applications. Messaging systems must be compatible with the format and protocols used by each of the applications that communicates through it. Further, messaging systems must keep track of message traffic in case of a failed message transmission, to facilitate fault recovery processes, and to ensure adequate message transmission success rates.

Most messaging systems employ a database for short-term message persistency and processing, and an archive for long-term storage of message data. An archive is particularly useful to prevent the database from being completely filled, which can cause loss of message data and/or a slowing of message processing and transmissions.

In a messaging system with high message throughput, archiving can fall short of database inflow rate despite using large amounts of processing resources. This still leads to overfilling of the database and the problems of lower message throughput and/or service quality.

SUMMARY

Systems and methods are disclosed that provide configurable parallel archiving process with flat workload distribution onto available archive processes. In one implementation, the number of running parallel processes can be changed at runtime for dynamic reconfigurability. The systems and methods described herein enable a scalable archiving process, with the number of work-processes to be configurable at runtime to accommodate high message-throughput.

In one aspect, a method of archiving messages processed by a messaging system includes starting a message archiving process, and receiving an instruction whether to increase or decrease a parallelization degree of the message archiving process.

In another aspect, a method of archiving messages processed by a messaging system includes generating a parallelization number p. The method further includes storing p random numbers in a control table, the random numbers selected from a range (M, N) where N>M, each random number initially being state-free in the control table, and generating p archive processes, each archive process configured to store one or more messages being processed by the messaging system to an archive. The method further includes assigning state-free random numbers to messages being processed by the messaging system, and dividing the messages being processed by the messaging system among the p archive processes according to the assigned state-free random numbers.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document discloses a configurable parallel archiving process and system. The systems and methods described herein provide a flat workload distribution onto a configurable number of available archive processes. Accordingly, a workload of messages to be archived is divided into separate but substantially same sized parts. These parts can be archived in parallel using separate archive processes for each part. In one implementation, the number of running parallel archive processes can be changed at runtime for dynamic reconfigurability.

Figure 1:
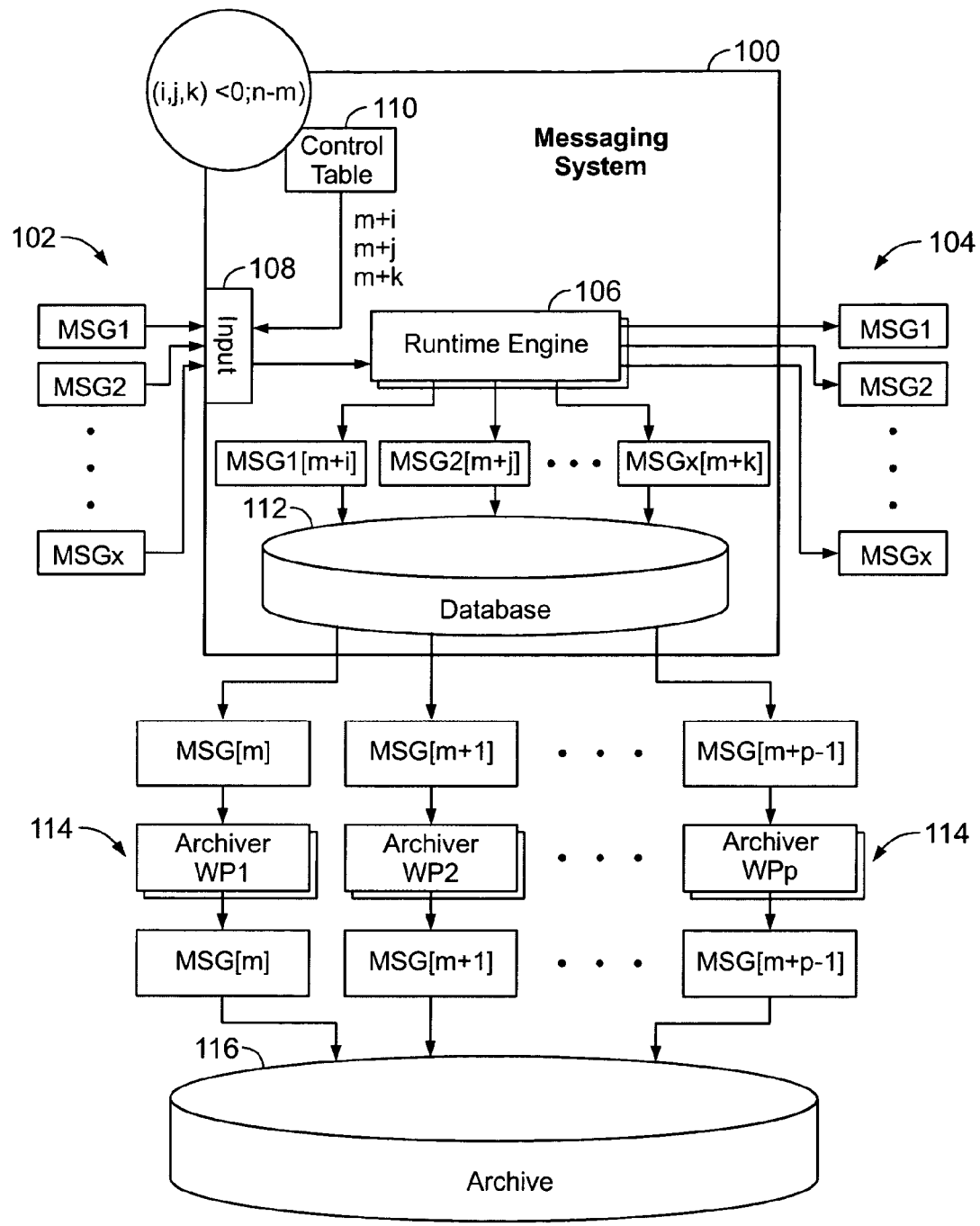
FIG. 1 is block diagram of a messaging system.

FIG. 1 is a functional block diagram of a messaging system 100 configured to receive incoming messages 102 from one or more sending applications and transmit them as outgoing messages 104 to one or more receiving applications. The messaging system 100 includes one or more active runtime engines 106 that is configured for processing messages sent through the messaging system 100. Each runtime engine 106 is generated according to a workload that defines a business process, such as a type and sequence of a messaging process between two applications, and handles business rules, mapping messages to receiving applications, message routing, and other tasks.

The runtime engine 106 is connected with an input 108 of the messaging system, where messages are assigned a random number from one or more random number control tables 110. In the system 100, $[(i, j, k)<0; n-m>]$ means that i, j, k are numbers within interval $<0; n-m>$. Msg[m] means all messages with random number m, and Msg1[m+i] means message 1 with random number m+i.

The runtime engine 106 temporarily stores or persists in a database 112 each message passing through the messaging system 100. These messages must be removed from the database 112 and stored in an archive 116 for efficient continued message processing capabilities by the messaging system. In accordance with a parallelization factor p generated by the runtime engine 106, a p number of archive processes 114 are created. Each archive process 114 handles a 1/p part of the messages in a workload, for storage of those messages in an archive. The p archive processes 114 enable a uniform division of the messages for archiving. Thus, processing resource requirements for dividing and archiving the messages of a workload are minimized.

The division of the workload happens dynamically at the runtime. Each incoming message to a messaging system receives a random number between m and n, where m<n. Each of the random numbers used are stored in a separate control table with a related process-state. A parallelization degree p is set for the messaging system 100, such that p archive processes 114 start in parallel at the beginning of the archiving, and where each archive process 114 starts with a particular random number. Accordingly, for each archive process 114, only a part of the messages from the workload is selected, related to one random number.

Archive processes 114 are activated and proceed with working on not-processed numbers until all numbers in the control table are used. The number used by an archive process 114 is regulated by the control table 110, where all random numbers are stored with their related state. The control table 110 enables the parallelization degree (i.e. the amount of archive processes 114 running) to be changed at the runtime of archiving, and keeps control of running archive processes 114. If the parallelization degree changes at runtime from lower to higher, additional archive processes 114 are started to work on the unprocessed numbers from the control table 110.

Figure 2:
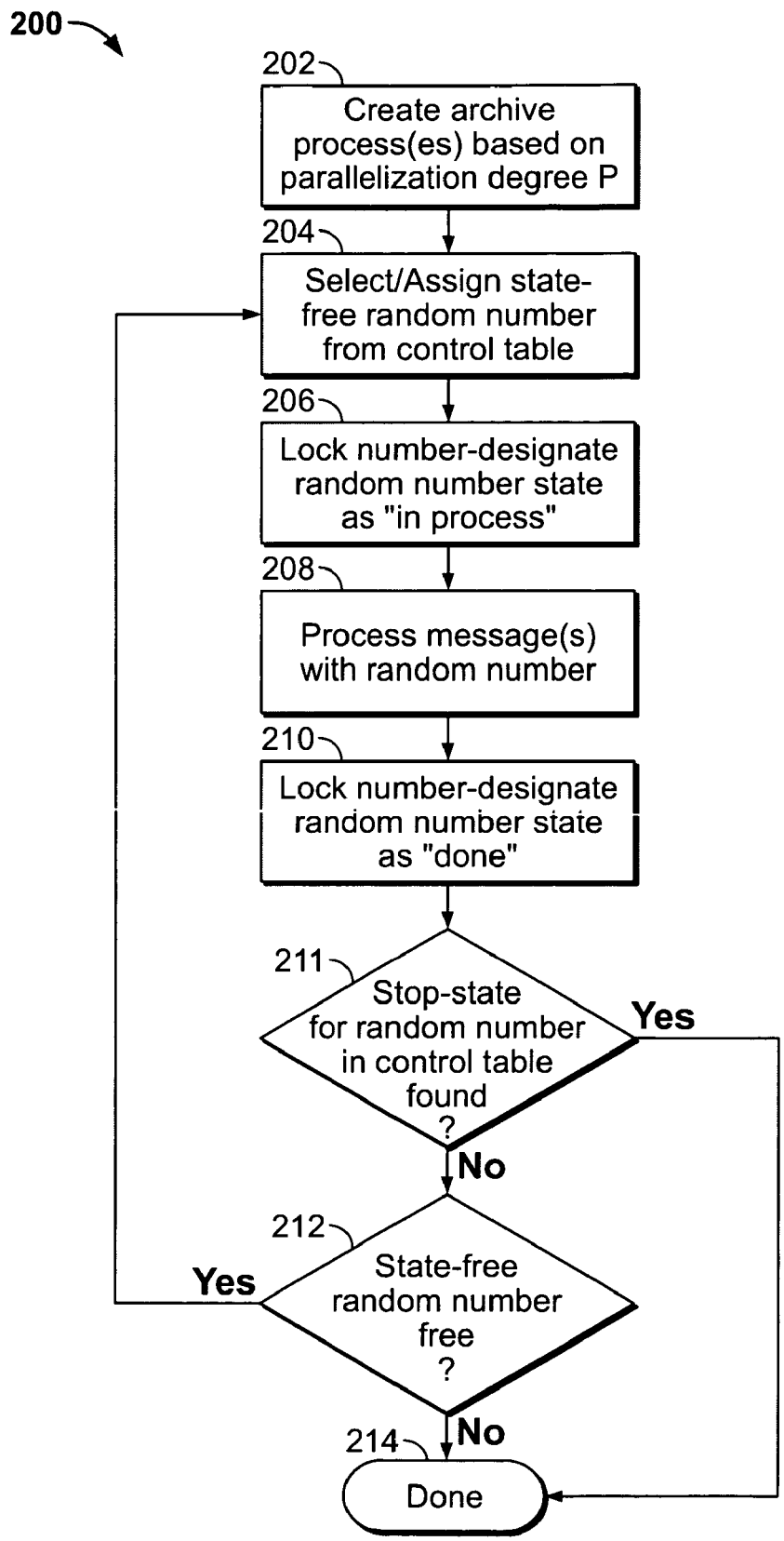
FIG. 2 is a block diagram of a runtime environment of a messaging system having parallel archiving.
Figure 3:
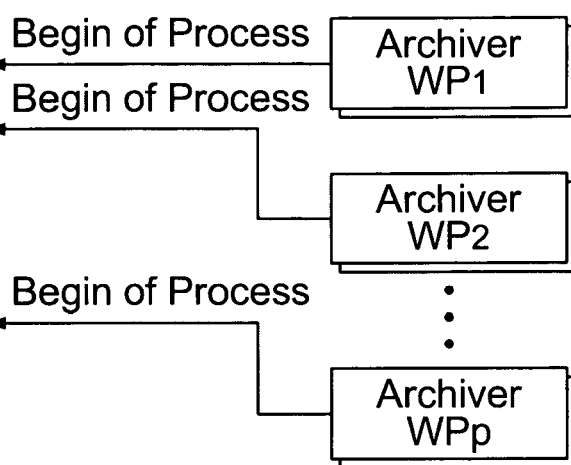
FIG. 3 is a flowchart a method for parallel archiving in a messaging system.

FIG. 2 illustrates an archiving process 200 for a messaging system. At 202, archive processes are created according to a configurable parallelization degree p. At 204, each archive process selects or is assigned a state-free number from a control table in the messaging system, and then locks it (e.g. by writing "in process" into a state field in the control table) at 206. FIG. 3 illustrates an example of this step and activity of the control table. At 208, each archive process then processes messages with the selected/assigned number.

Figure 4:
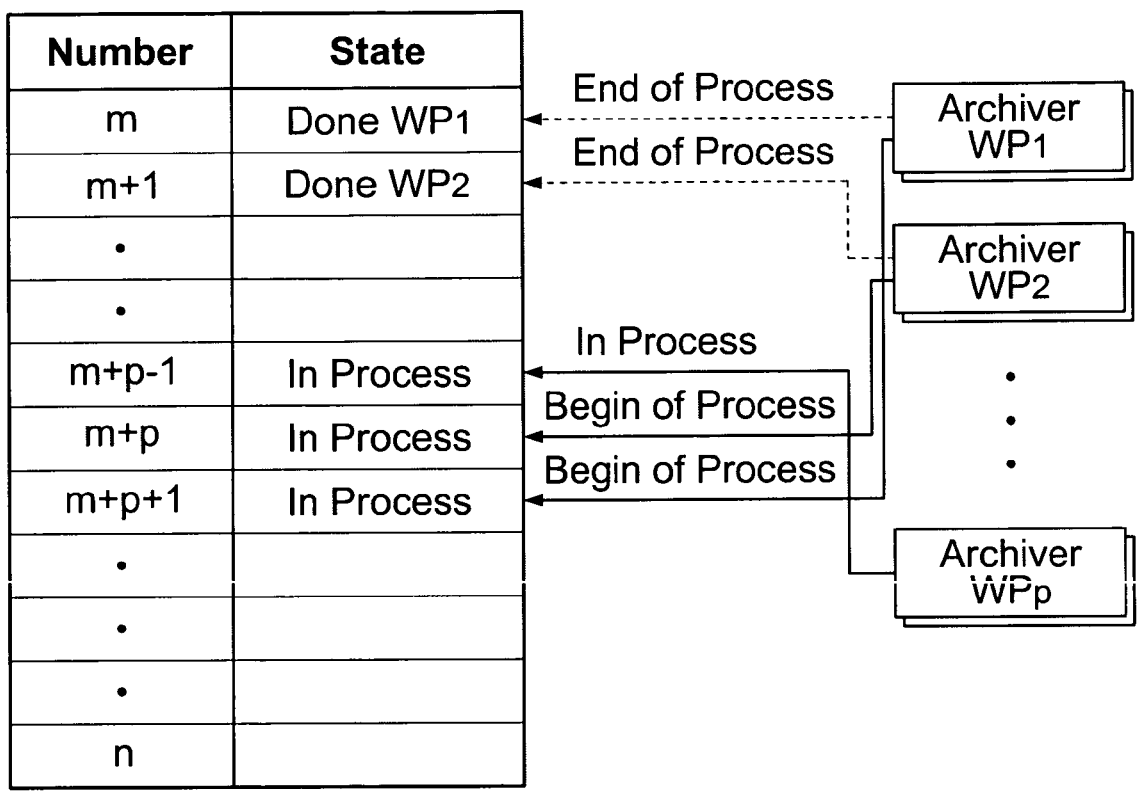
FIG. 4 illustrates an exemplary embodiment of a control table

At 210, an archive process that finishes processing messages with a certain number then locks the number in the control table with a final state (e.g. writing "done" into the state field of the control table), and picks another state-free number (if it exists) from the control table as exemplified in FIG. 4. At 211, a determination is made whether a stop-state if found for a random number in the control table. If so, the state is cleared for that number and the process 200 is finished at 214. If not, the process 200 continues at 212, where a determination is made whether any state-free numbers still exist in the control table. If so, the archiving process 200 continues again at 204. If not, the archiving process 200 is done at 214.

Figure 5:
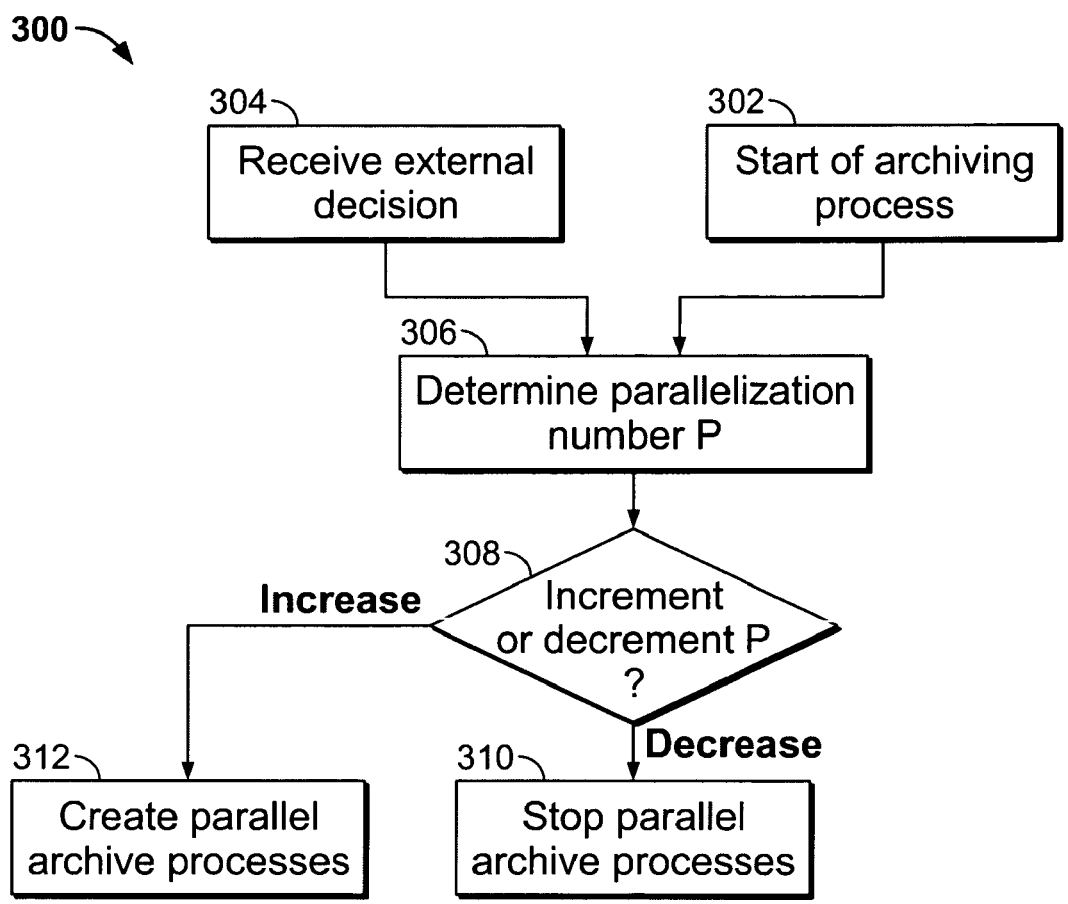
FIG. 5 is a flowchart of a method for increasing or decreasing a parallelization degree of an archiving process.

FIG. 5 illustrates a method 300 for archiving messages from a messaging system in accordance with an embodiment. At 302, the archiving process is started. The control table is initialized, where if the state for all random numbers in the control table are "done," then the states are cleared. At 304, at any time, a signal representing an external decision is received for changing the parallelization degree p, to execute 306.

At 308, a determination is made whether to increment or decrement the parallelization degree p, based on the external decision. If the decision is to increase, then at 312 a new number of parallel archive processes are created. If the decision is to decrease, at 310 a number of parallel archive processes are stopped. Also at 310, the stop-state record is created for any state-free random number in the control table, and so a query is executed whether a state-free number exists in the control table. If yes, a stop-state is created for that number. The query should run for abs(d) times, where (d) is a difference between the new parallelization and the former parallelization.

Although a few embodiments have been described in detail above, other modifications are possible. The logic flows depicted in FIGS. 2 and 5 need not be executed in the exact order shown. Other embodiments may be within the scope of the following claims.

The invention claimed is:

1. A method comprising:
    receiving a plurality of incoming message at a messaging system;
    assigning, by a runtime engine of the messaging system, a random number to each of the plurality of incoming messages;
    generating, by the runtime engine, a parallelization degree p;
    storing the random numbers assigned to each of the incoming messages in a control table of the messaging system, each random number being stored in the control table with a related process state, the process state of each of the random numbers in the control table initially being state-free;
    starting p archive processes in parallel;
    selecting one of the random numbers from the control table for each of the p archive processes;
    processing the incoming messages by the p archive processes, the processing comprising each of the p archive processes locking the random number selected for that archive process in an in-process state and processing the incoming messages to which the random number selected for that archive process is assigned.

2. The method in accordance with claim 1, wherein processing the incoming messages comprises removing the incoming messages from a database and storing the incoming messages in an archive.

3. The method in accordance with claim 2, wherein archiving the messages further comprises, when each of the p archive processes completes processing the incoming messages to which the random number selected for that archive process is assigned, designating, the in control table, a done state for the process state of the random number selected for that archive process.

4. The method in accordance with claim 2, further comprising, when one of the p archive process completes processing of all of the incoming messages to which the random number selected for that archive process is assigned, determining whether other random numbers whose process states are state-free remain in the control table, selecting one of the other random numbers whose process state is state-free for the one of the p archive processes, locking the one of the other random numbers, and processing the incoming messages to which the one of the other random numbers is assigned.

5. The method in accordance with claim 4, further comprising stopping archiving of the incoming messages when no other state-free random numbers remain in the control table.

6. A messaging system comprising:
    at least one processor implementing one or more runtime engines, each runtime engine configured to receive and transmit messages from a sending application to one or more receiving applications based on a workload;
    a database configured for persistence of the messages; and
    an archive configured for long-term archiving of the messages from the database; wherein the one or more runtime engines perform functions comprising:
    temporarily storing the messages in the database;
    assigning, by a runtime engine of the messaging system, a random number to each of the messages;
    generating a parallelization degree p;
    storing the random numbers assigned to each of the messages in a control table, each random number being stored in the control table with a related process state, the process state of each of the random numbers in the control table initially being state-free;
    starting p archive processes in parallel;
    selecting one of the random numbers from the control table for each of the p archive processes;
    processing the messages by the p archive processes, the processing comprising each of the p archive processes locking the random number selected for that archive process in an in-process state and processing the messages to which the random number selected for that archive process is assigned, the processing of each message comprising removing the message from the database and storing the message in an archive.

7. The method in accordance with claim 1, wherein the random numbers are within a range (M, N) where N>M.

8. The method in accordance with claim 2, further comprising the messaging system generating the runtime engine according to a type and sequence of a messaging process between two applications in a business process.

9. The method in accordance with claim 2, further comprising temporarily storing the incoming messages in the database before the incoming messages are processed by the p archive processes.

10. The method in accordance with claim 1, further comprising receiving an external decision to change the parallelization degree p, by incrementing or decrementing the parallelization degree p to a new parallelization degree.

11. The method in accordance with claim 10, further comprising, if the new parallelization degree is larger than the parallelization degree p, starting one or more new archive processes, and if the new parallelization degree is smaller than the parallelization degree p, stopping one or more of the p archive processes.

12. The method in accordance with claim 11, wherein stopping the one or more of the p archive processes comprises executing a query to find a remaining state free random number in the control table and changing the process state of the remaining state-free random number to a stop-state.

13. The method in accordance with claim 12, further comprising running the query a number of times equal to the absolute value of a difference between the parallelization degree p and the new parallelization degree.

* * * * *